United States Patent [19]

Wakerly et al.

[11] Patent Number: 4,975,903
[45] Date of Patent: Dec. 4, 1990

[54] DIGITAL TIMESLOT AND SIGNALING BUS IN A DIGITAL PBX SWITCH

[75] Inventors: John F. Wakerly, Mountain View; Samuel F. Wood, Los Altos Hills, both of Calif.

[73] Assignee: David Systems, Inc., Sunnyvale, Calif.

[21] Appl. No.: 456,084

[22] Filed: Dec. 21, 1989

Related U.S. Application Data

[63] Continuation of Ser. No. 377,749, Jul. 7, 1989, abandoned, which is a continuation of Ser. No. 168,542, Mar. 8, 1988, abandoned, which is a continuation of Ser. No. 913,597, Sep. 26, 1986, abandoned, which is a continuation of Ser. No. 852,396, Apr. 15, 1986, abandoned, which is a continuation of Ser. No. 607,999, May 7, 1984, abandoned.

[51] Int. Cl.[5] .............................................. H04Q 11/04
[52] U.S. Cl. ....................................................... 370/67
[58] Field of Search ................ 370/29, 67, 79, 85.1, 370/85.7, 95.1, 104, 110.1, 93, 196, 198, 242, 290

[56] References Cited

U.S. PATENT DOCUMENTS

| | | | |
|---|---|---|---|
| 3,226,484 | 11/1961 | James | 370/56 |
| 3,281,537 | 10/1962 | Dupieux et al. | 370/63 |
| 3,443,033 | 10/1963 | Louis | 370/110.1 |
| 3,558,827 | 1/1971 | Lucas et al. | 379/224 |
| 3,597,548 | 8/1971 | Drianan et al. | 370/64 |
| 3,705,266 | 12/1972 | Philip | 370/58.1 |
| 3,767,857 | 10/1973 | Colas et al. | 379/252 |
| 3,859,466 | 1/1975 | Hartmann | 370/103 |
| 3,908,092 | 9/1975 | Hight et al. | 370/59 |
| 3,924,077 | 12/1975 | Blakeslee | 370/80 |
| 3,937,892 | 2/1976 | Bloch et al. | 370/85.7 |
| 4,017,841 | 4/1977 | Jensen | 364/900 |
| 4,022,979 | 5/1977 | Smith | 370/14 |
| 4,063,220 | 12/1977 | Metcalfe et al. | 340/825.5 |
| 4,076,966 | 2/1978 | Bovo et al. | 370/62 |
| 4,119,807 | 10/1978 | Nahay | 370/62 |
| 4,152,548 | 5/1979 | Horiki | 370/110.1 |
| 4,178,479 | 12/1979 | McDonald et al. | 370/59 |
| 4,187,399 | 2/1980 | Maxfield et al. | 370/67 |
| 4,203,005 | 5/1980 | Fukuda et al. | 370/62 |
| 4,224,688 | 9/1980 | Ciancibello et al. | 370/62 |
| 4,228,536 | 10/1980 | Gueldenpfennig et al. | 370/66 |
| 4,232,386 | 11/1980 | McDonald et al. | 370/68 |
| 4,253,179 | 2/1981 | Shimizu | 370/67 |
| 4,254,496 | 3/1981 | Münter | 370/16 |
| 4,288,870 | 9/1981 | McDonald et al. | 370/63 |
| 4,330,857 | 5/1982 | Alvarez, III et al. | 370/104 |
| 4,339,633 | 7/1982 | Ahmed | 370/85 |
| 4,370,743 | 1/1983 | Moran | 370/67 |
| 4,387,457 | 6/1983 | Münter | 370/62 |
| 4,390,982 | 6/1983 | Williams et al. | 179/18 AD |
| 4,402,077 | 8/1983 | Simmons et al. | 370/63 |
| 4,412,322 | 10/1983 | Briley et al. | 370/58.1 |
| 4,413,335 | 11/1983 | Clements et al. | 370/16 |
| 4,450,557 | 5/1984 | Münter | 370/67 |
| 4,455,646 | 6/1984 | Bloodsworth | 370/67 |
| 4,468,655 | 8/1984 | Iwata | 340/518 |
| 4,470,139 | 9/1984 | Münter | 370/66 |
| 4,481,624 | 11/1984 | Baranyai et al. | 370/62 |
| 4,488,290 | 12/1984 | Dunn et al. | 370/67 |
| 4,488,292 | 12/1984 | Troost | 370/63 |

FOREIGN PATENT DOCUMENTS 0138453 5/1985 European Pat. Off. .

OTHER PUBLICATIONS

9th International Teletraffic Congress (I.T.C.9), 17–24th Oct. 1979, Torremolinos, Spain, pp. 1–6, K. Okada et al., "New Architecture and the Traffic Aspects of Switching Network Using Microprocessors".
Bacher et al., "Time Division Multiplex System ZD1000-Cl for Telegraph and Data Transmission", Telecomm. Report 1, No. 4, Feb. 1978, pp. 255–260.

Primary Examiner—Douglas W. Olms
Assistant Examiner—Wellington Chin
Attorney, Agent, or Firm—Townsend and Townsend

[57] ABSTRACT

A switch in a digital PBX system supporting both centralized an distributed switching techniques. The switch has nearly universal and parallel bus between line card modules. Then a timeslot bus capable of having more than one module may communicate voice PCM or data signals during one timeslot. The bus also has a signaling bus by which line card modules are selected to communicate with a central control module by a single line to maintain the universality of the bus. Signaling information is also passed between a selected line card module and the central control module by a pair of parallel lines.

28 Claims, 6 Drawing Sheets

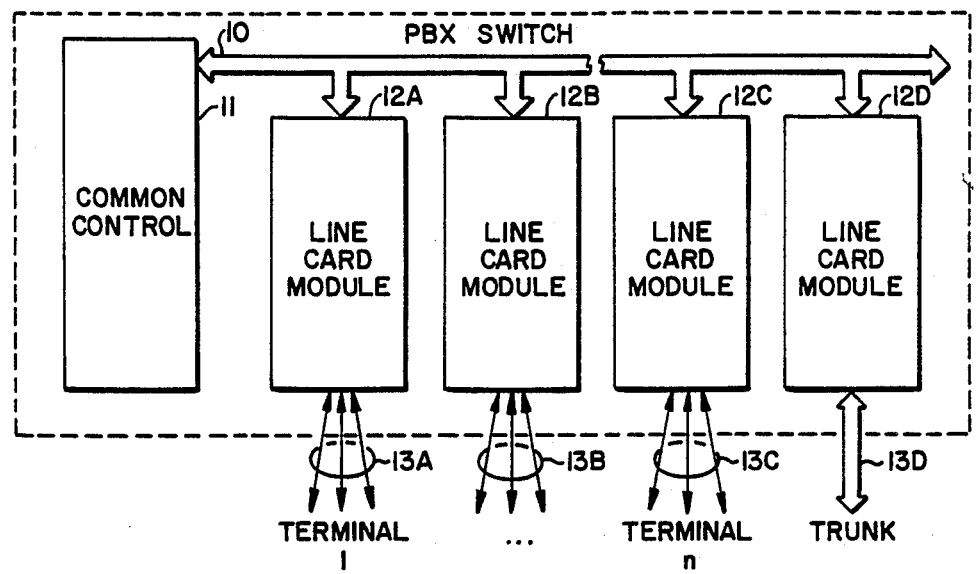
FIG._1.
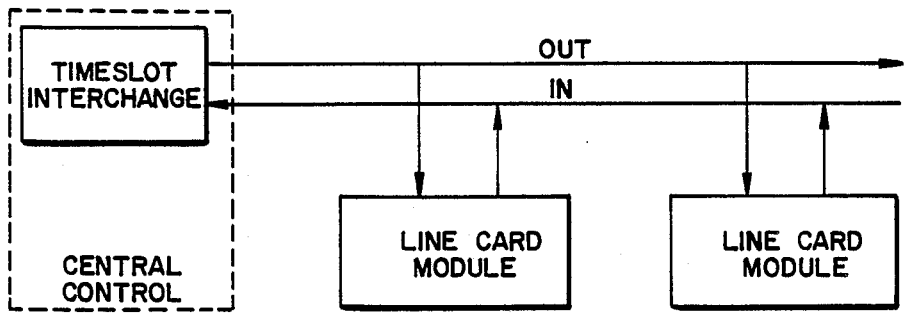
FIG._2A.
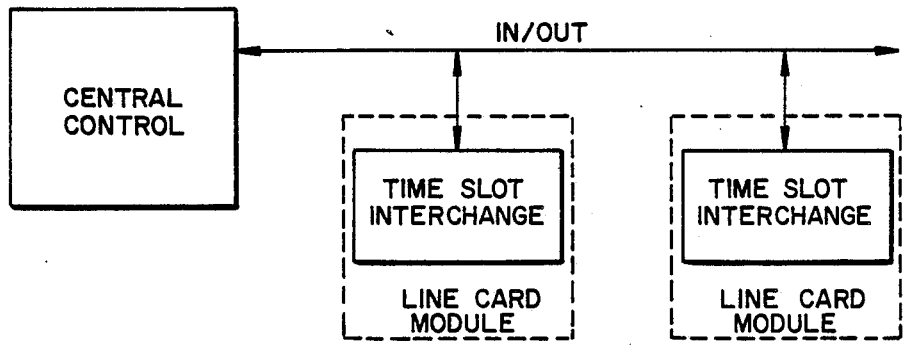
FIG._2B.

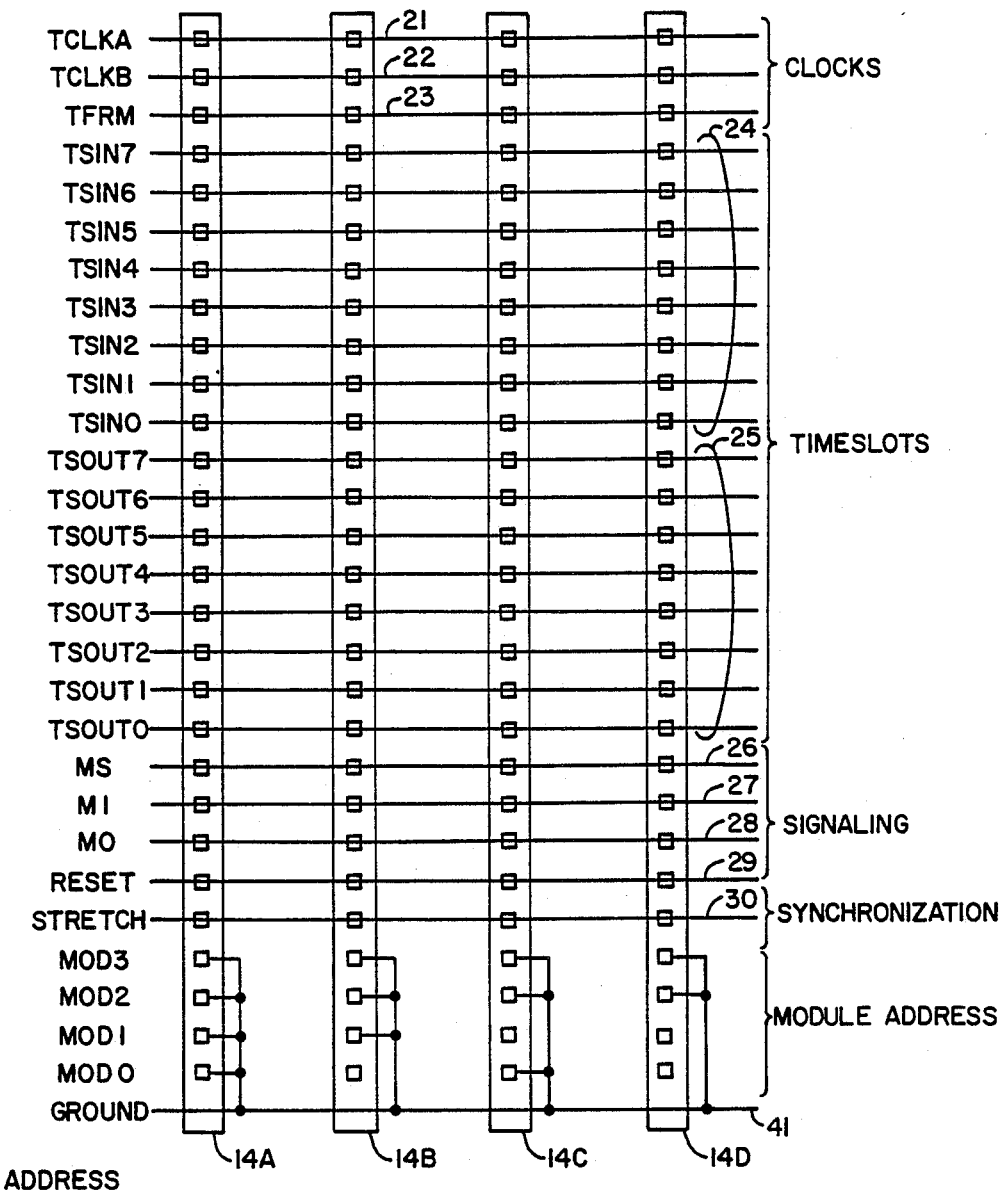
FIG._3.

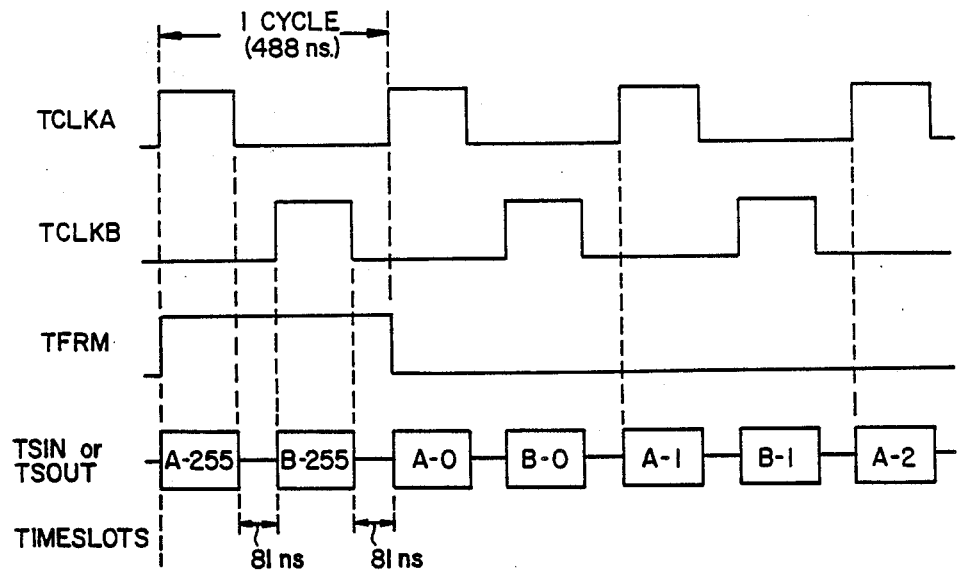
FIG._4.
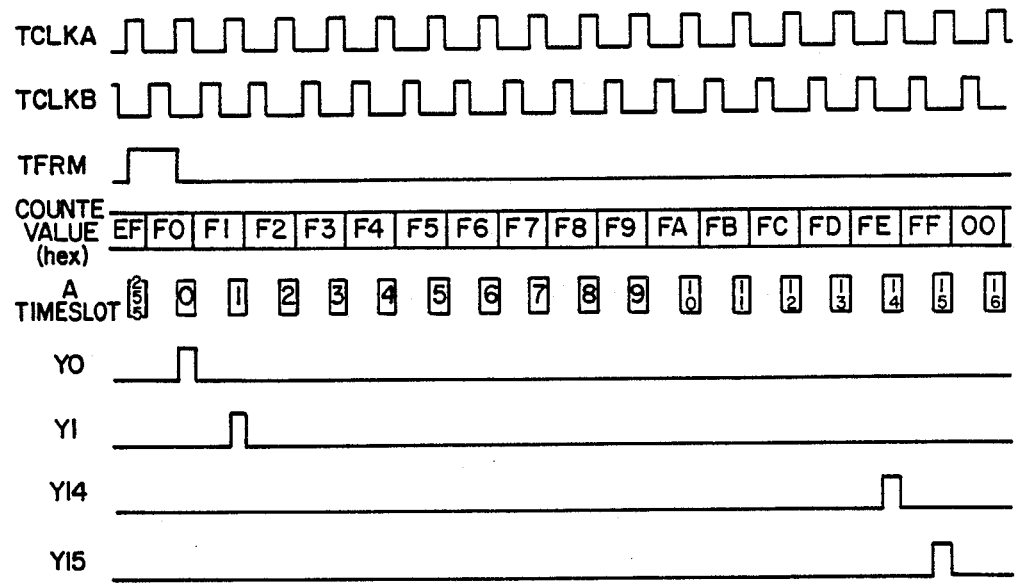
FIG._5B.

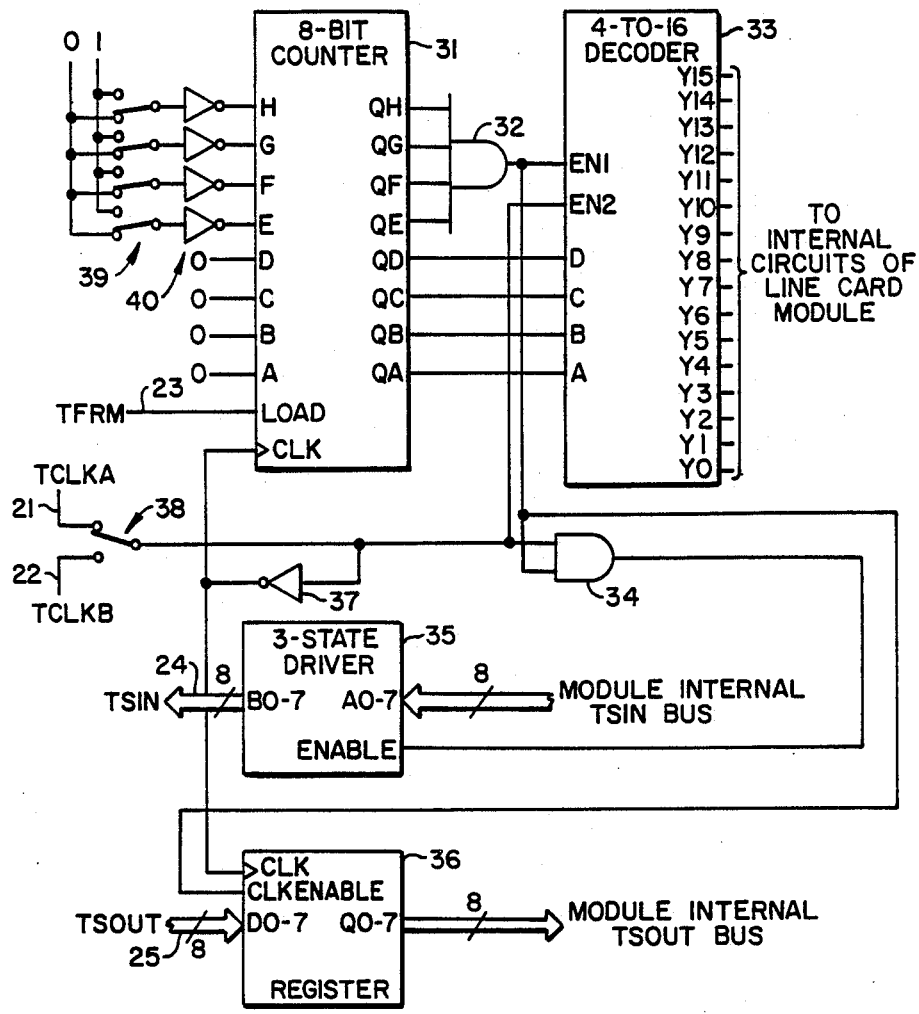
FIG._5A.
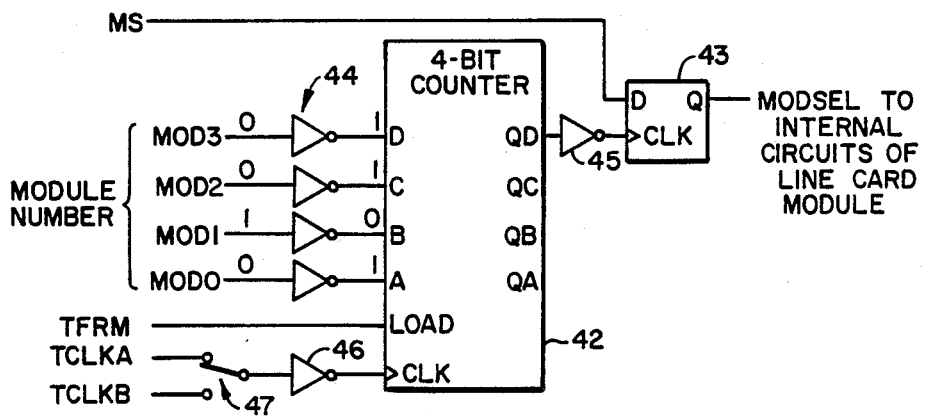
FIG._6A.

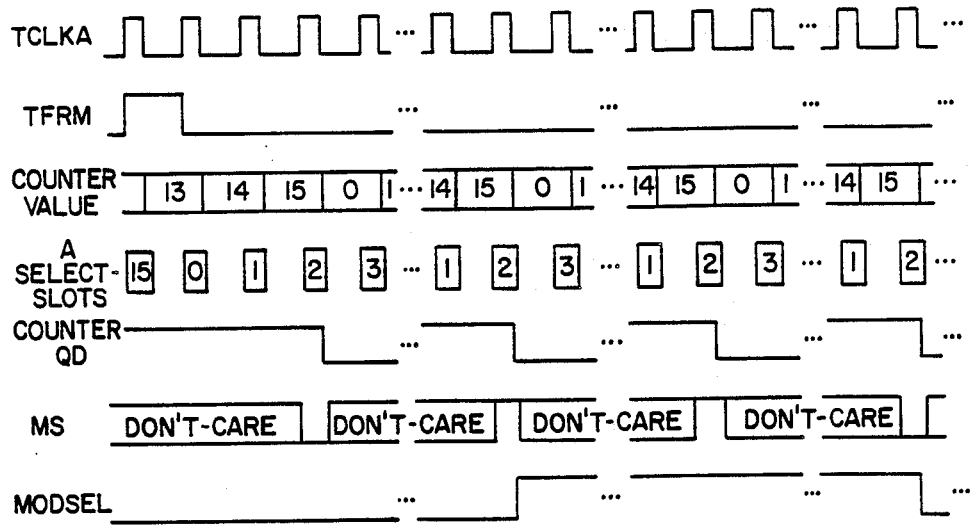
FIG.—6B.
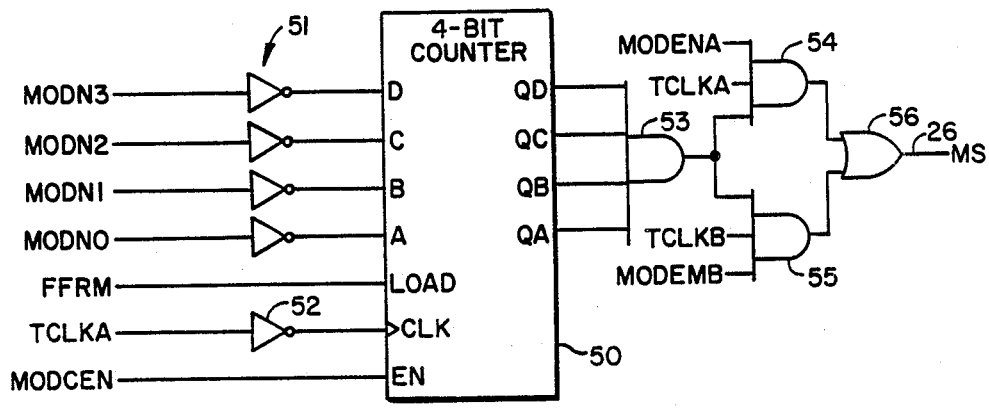
FIG.—7.

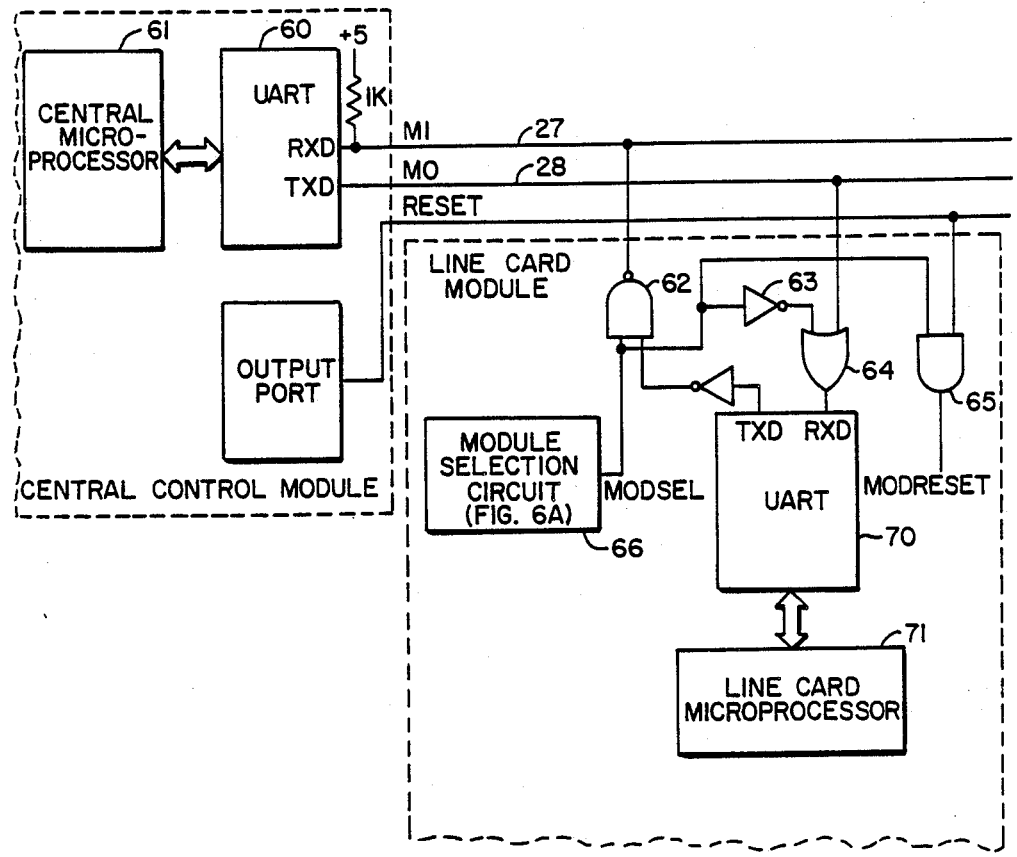
FIG._8.

DIGITAL TIMESLOT AND SIGNALING BUS IN A DIGITAL PBX SWITCH

This patent application is a continuation of U.S. Ser. No. 377,749, now abandoned, filed July 7, 1989; which is a continuation of abandoned U.S. Ser. No. 168,542, filed Mar. 8, 1988; which is a continuation of abandoned U.S. Ser. No. 913,597, filed Sept. 26, 1986; which is a continuation of abandoned U.S. Ser. No. 852,396, filed Apr. 15, 1986; which is a continuation of abandoned U.S. Ser. No. 607,999, filed May 7, 1984.

FIELD OF THE INVENTION

The present invention relates to a private branch exchange (PBX) in the field of digital telephony and, more particularly, to a timeslot bus and a signaling bus in a digital PBX switch capable of carrying voice and data signals.

BACKGROUND OF THE INVENTION

PBXs are increasingly being used in present day telephone systems. A PBX system ties together the telephones of an office, building or factory. Anyone within the PBX system can talk to someone else within the system without the cost and time of using outside lines and facilities.

Increasingly, PBX systems are becoming digital. The analog voice signals of a caller are converted into a digital representation. These digital signals are transmitted through the PBX system. Furthermore, PBX systems are increasingly used to transport computer data signals. This is due, in part, to the availability of personal computers in the home and office.

The heart of the system, the PBX switch as shown in FIG. 1, connects callers within the system, connects callers to outside lines if a call outside the PBX system is desired, and connects outside callers to lines within the system. A PBX switch generally has a number of modules or "line cards." Each line card is connected to a number of telephones or "terminals" and the line cards are connected to each other by a set of lines called a "bus", or sometimes, the "backplane bus." The bus, such as bus 10 in FIG. 1, has a timeslot bus. The timeslot bus carries the digital signals of a voice or the data of a computer, for example.

In a digital PBX, the voice signals are sampled at some rate, typically 8000 times per second (8 KHz), and the resulting voltage samples are converted into a digital representation, typically 8-bit "μ-law" or "A-law" encoding. The resulting sequence of bits (8000 times 8, or 64K bits/sec) is called the Pulse Code Modulation (PCM) representation of the original voice signal. The digital PBX transports and switches the PCM signals from place to place within the PBX system. Eventually, the PCM signals are converted back into an analog voice signal for a person to hear.

The PCM signals are carried on the bus 10 on which the signals are carried during particular time intervals, or timeslots. Each timeslot can carry the PCM 64K bit/second stream of data so that typically one timeslot is required for each incoming or outgoing voice path. Of course, a timeslot can also be used to carry computer data at rates up to 64K bits per second.

Besides a timeslot bus, the bus 10 has a signaling bus. Besides PCM-encoded voice signals and data signals, a digital PBX switch must also transport and switch "signaling" or control information associated with individual voice or data ports. For example, for a rotary-dial telephone it is important to know that the handset has been taken "off-hook," that a digit has been dialed, and so on. Thus, the PBX switch must have a way of gathering signaling information from individual voice ports, and transporting it to a control unit which acts upon this information by, for example, making voice connections.

All digital PBX switches must have a timeslot bus and a signaling bus of some kind. Associated with these buses are many conflicting goals and problems. Among these are:

(a) Universal bus and parallel bus wiring. A bus in a typical system has some number of "positions"; each position has a bus connector which mates with a module or line card connector to connect a module to the bus. A bus is "universal" if the same signals exist in the same positions in every bus connector in the bus. In a universal bus, any module may be connected at any position in the bus. The advantages of such a system are evident.

A completely parallel bus topology satisfies the requirements of a universal bus. It is easily laid out in printed circuit board technology. Regardless of the number of positions in the bus, it can be easily connected at any point.

If just a few lines are not parallel, such as a star topology about the control unit, there are different lines at each potential breakpoint. Each position is different from the rest. The bus is no longer universal.

(b) Maximum data transfer bandwidth for a given maximum signal speed.

Several performance characteristics of a bus are limited by the maximum switching signal speed on the bus. For example, faster switching speeds limit the maximum bus length and also generate more radio frequency interference. On the other hand, faster speeds allow the bus to carry more information with a smaller number of wires. Therefore, with a given maximum switching signal speed, as many signals as possible should use this maximum speed to achieve maximum data transfer bandwidth.

(c) Flexible timeslot allocation.

Since different modules may service different numbers of voice paths, the goal of a universal bus implies that there should not be a fixed number of timeslots associated with any given bus position, even when centralized timeslot switching (FIG. 2a)) is used. Rather, timeslots should be allocated to individual modules as required by the particular system configuration.

(d) Individual module addressability.

Despite parallel bus wiring and universality, it is necessary to have some means of selecting individual line card modules for operations, such as sending and receiving signaling information, polling, and resetting. However, providing a separate "module select" line for each module violates the desired configuration of parallel bus wiring and resulting universality.

(e) Centralized or distributed timeslot switching.

There are two different timeslot switching techniques that are used in existing PBXs. "Centralized" switching is shown in FIG. 2a). In this technique, there are logically two timeslot buses to carry voice and data signals. One bus carries outgoing timeslot signals from the central control unit to the line card modules containing the individual port circuits, and the other carries incoming timeslot signals, in the opposite direction. Each bus has a dedicated timeslot for every port in the system. For example, a voice port "X" always places its PCM signals on an incoming timeslot X, and receives PCM signals on an outgoing timeslot X.

Since the central control unit receives all incoming timeslot signals and transmits the voice or data signals on all outgoing timeslots to the line cards, timeslot-interchange circuits in the central control unit can make all connections. For example, to connect ports X and Y, the timeslot-interchange circuits in the central control unit are programmed to store the PCM samples that arrive on incoming timeslot X and transmit them on outgoing timeslot Y; and to simultaneously store the PCM signals that arrive on the incoming timeslot Y and transmit them on the outgoing timeslot X.

In "distributed" switching, shown in FIG. 2(b), there is logically just a single timeslot bus, and there are no centralized timeslot-interchange circuits. Instead, each line card module has a local timeslot-interchange circuit which can connect the incoming signals from any port to any timeslot on the timeslot bus, and which can also listen to the signals on any timeslot and send them to any outgoing port.

In this technique, to connect ports X and Y, the central control unit may allocate a pair of timeslots, say P and Q, which need not have any fixed relationship to X and Y. It then instructs the local timeslot-interchange circuit for port X to transmit on timeslot P and receive on Q, while it instructs the local timeslot-interchange circuit for port Y to transmit on Q and receive on P.

Typically, the choice of either centralized or distributed timeslot switching is based on the performance of the switching technique and the cost effectiveness of the technologies available at the time of the design. For example, the distributed technique utilizes timeslots more efficiently, since timeslots are not allocated for idle ports, while the centralized technique is typically less costly, since it requires just one timeslot-interchange circuit.

The present invention attains many of these goals and solves or substantially mitigates many of these problems above.

SUMMARY OF THE INVENTION

The present invention provides for a PBX switch comprising a plurality of modules, each module having at least one port for communicating signals to and from the PBX switch; a plurality of parallel lines for communicating the signals between the modules; and clock means coupled to the modules for defining a number of timeslots for the signals on the communication lines and for enabling the modules to communicate during a predetermined portion of a timeslot whereby more than one module may communicate in one timeslot.

Thus, the parallel communication lines provide the universal bus in the present invention. Also, data transfer rate is maximized without increasing the switching speeds of the timeslots.

Each module can be individually addressed. Each module has means for generating signals to identify the module and means, coupled to the identification means and the clock means mentioned above, for selecting a timeslot for the module so that a signal at the selected timeslot on one of the lines coupled to the timeslot selection means addresses the module.

The invention provides for both the centralized and distributed timeslot switching. The PBX switch has a central control module in addition to line card modules having ports to the outside world. In centralized switching, the central control module transmits signals to the line card modules on a first set of the parallel lines and receives signals from the line card modules on a second set of the parallel lines. The control module also transmits and receives control messages to and from the modules on a third set of parallel lines. For distributed switching the control module has a means for disabling the control module from transmitting signals on the first set of lines in predetermined timeslots and for generating control messages indicative of the control module disablement on the third set of lines. The line card modules themselves have means coupled to the third set of lines for transmitting signals on the first or second set of lines and for receiving signals on the first or second set of lines during the predetermined timeslots. During these timeslots the architecture of the PBX switch operates in a distributed manner.

BRIEF DESCRIPTION OF THE DRAWINGS

An understanding of the invention may be achieved by a perusal of the following Detailed Description with referenced to the following drawings:

FIG. 1 shows the configuration of digital PBX switch.

FIG. 2A shows a digital PBX operating in a centralized switching configuration; FIG. 2B shows a digital PBX operating in a distributed switching configuration.

FIG. 3 details the timeslot and signaling buses of the present invention.

FIG. 4 illustrates the clock operations and timeslot timing of the present invention.

FIG. 5A shows diagramatically, the timeslot decoding circuit used in the line card modules connected to the timeslot bus of FIG. 3; the timing operations of the circuit are shown in FIG. 5B.

FIG. 6A details the module selection circuit on each line card module connected to the signaling bus of FIG. 3; the circuit's timing operations are shown in FIG. 6B.

FIG. 7 illustrates the central control module circuit used in driving the line card module selection line of the signaling bus of FIG. 3.

FIG. 8 shows the central control module and line card module circuits coupled to the Message In, Message Out and Reset lines of the signaling bus of FIG. 3.

DETAILED DESCRIPTION OF THE PREFERRED EMBODIMENTS

FIG. 1 shows the configuration of a general digital PBX switch. The switch typically has a central control module 11 and line card modules 12A–D. The control module 11 operates the central operation of the switch, such as gathering signal information from the individual modules 12A–D and coordinating the operations between the modules 12A–D. The line card module 12A–D typically has a plurality of ports through which voice and data are carried to and from the switch. These ports each have individual communication lines 13A–13C, which have terminals, such as telephones, connected at the end. Other line card modules (such as 12D) are connected to trunk lines 130, which may be connected to another PBX switch (and another PBX system) or to the general telephone system or the like. The central control module 10 and line card modules 12A–D communicate through a bus 10.

FIG. 3 shows the details of a bus, according to the present invention, particularly useful in digital PBX switches. The lines are connected to line card modules through connectors 14A–14D. In accordance with the design goal of universality, all bus lines are completely parallel, with the exception of the unique module address terminals connected selectively to a ground line 31. This is discussed later.

The bus in FIG. 3 is divided into three groups. The first group is a set of clock lines 21-23. The second group is a set of timeslot lines 24, 25 over which voice PCM signals and data signals pass between the modules of the PBX switch. The third group is a set of signaling lines 26-29. These lines 26-29 carry the signaling information between the modules.

Although all bus positions are identical except for the module-address signals, different types of modules may be connected at each bus position. In particular, one module should be the "bus master" in the sense that it supplies the clocks and other master control signals to which the other modules respond. In fact, this module is called "the central control unit." One advantage of the present invention is that the central control module (or any other module) may be connected at any bus position.

The first group of signals in FIG. 3 are clocks provided by the central control module on lines 21-23. FIG. 4 shows the timing of these clocks in the present embodiment of the invention. The signal TCLKA on the line 21 is a 2.048 MHz, 33% duty-cycle clock; the signal TCLKB on the line 22 is a similar 2.048 MHz, 33% duty-cycle clock that is 180 degrees out of phase with TCLKA. The importance of the shapes (or duty-cycles) of the clock signals in the invention is discussed later. The period of either clock is 1/(2.048 MHz), or approximately 488 nanoseconds (ns).

The TFRM signal is a framing signal which is active for one clock period every 125 microseconds (μs), or for one out of every 256 TCLKA or TCLKB periods. The interval between successive TFRM pulses is called a "frame." This 125 μs frame period is standard with μ-law or A-law PCM.

The number of timeslots available for a given maximum clock frequency (2.048 MHz in the present embodiment) is maximized. In a customary timeslot bus design, there is but a single timeslot clock ("TCLK"), and the timeslot bus carries a single PCM or data signal for a full TCLK period. In a 488 ns TCLK period there are defined 256 timeslots in a 125 82 s frame.

The present invention uses two 2.048 MHz, 33% duty-cycle clocks, TCLKA and TCLKA, allowing two timeslots to be defined within each 488 ns clock period.

As shown in FIG. 4, timeslots are divided into two groups, "A" and "B". "A" timeslots occur when TCLKA is high, and "B" timeslots occur when TCLKB is high. By convention, in either group, the first timeslot to occur after the TFRM signals occurs is number 0; the remainder are numbered sequentially through 255. Thus, the TCLKA, TCLKB, and TFRM signals define 512 timeslots, numbered A-0 through A-255 and B-0 through B-255.

With timeslots defined, voice PCM or data signals are carried in parallel on the timeslot bus of lines 24, 25 during the interval of particular timeslots. FIG. 3 shows a centralized timeslot switching arrangement. There are two timeslot buses, the timeslot bus 24 for TSIN signals for incoming timeslot signals (from an arbitrary module to the central control module) and the timeslot bus 25 for TSOUT signals for outgoing timeslot signals (from the central control module to other modules). Each of these buses is 8 bits wide. At any instant (timeslot) a bus carries a complete 8-bit PCM or data signal.

In the centralized switching arrangement the central control module contains timeslot-interchange circuits which store all of the signals received on the (incoming) TSIN bus 24, and which send the stored signals on any timeslot on the (outgoing) TSOUT bus 25. Thus, the central control module can connect any incoming timeslot signals to any outgoing timeslot.

In the centralized switching arrangement, the central control module always drives the TSOUT bus 25, but different line card modules drive the TSIN bus 24 during different timeslots. The multiple-source capability for driving the TSIN bus 24 is achieved by the current practice of using three-state drivers on each module. To drive the TSIN bus 24, the TSIN bus driver on a particular module is enabled only during the TSIN timeslots allocated to that module, and disabled at all other times. Whoever allocates the TSIN timeslots to modules must ensure that each TSIN timeslot is driven by no more than one module.

Depending on how timeslots are allocated to the modules, it is possible that successive TSIN timeslots may be driven by different modules. For example, referring to FIG. 4, timeslot B-0 may be driven by module P, while timeslot A-1 may be driven by module Q. In this case, it is important for module P's TSIN driver to be disabled before module Q's is enabled. Otherwise, both P and Q modules will be driving the TSIN bus for a short period of time, possibly resulting in increased system noise and/or driver stress (hence, failure rates), depending on the technology of the drivers. In the present dominant bus driver technology of three-state transistor-transistor-logic (TTL), driver stress and system noise may be especially severe if more than one line card module driver drives a bus simultaneously.

On one hand, manufacturers of three-state TTL drivers (such as the 74LS244 integrated circuit) have tried to minimize these effects by designing the drivers to "turn off" faster than the "turn on." Thus, if one 74LS244 part on a bus is disabled and another is simultaneously enabled, the first will stop driving the bus typically some 15 ns before the second starts to drive it. On the other hand, it is impossible to simultaneously disable one driver and enable another. Differences in propagation delays in the enabling logic for the two drivers, plus the physical distance between the drivers (significant in a bus system), can easily wipe out the 15 ns safety margin built into the 74LS244 part and similar drivers.

To avoid these problems the TCLKA and TCLKB clocks on the lines 21, 22 have 33% duty cycle. Instead of being on for 50% of the 488 ns time period, the clocks are on for only a third of the period. With this duty cycle, there is a 16%-of-duty-cycle "dead-time" between successive timeslots on both the TSIN and TSOUT buses 24, 25. In the present embodiment of the invention, with 2.048 MHz clocks, this amounts to an 81 ns "dead-time," independent of the driver characteristics.

Thus, if more TCLK clocks are placed into the system, a duty cycle time of less than (1/N)T, where N is the number of the clocks and T is the period of the clocks, this ensures that some dead-time is inserted between timeslots.

This dead-time is important on the TSIN bus 24 in the centralized switching arrangement. With the clock arrangement in the present invention, a module merely needs to ensure that it only drives the TSOUT bus when TCLKA or TCLKB is high. At 2.048 MHz, there are 81 ns of margin to compensate for the propagation delays of the logic circuits on each module that make the enable/disable decision at each clock period.

In the centralized switching arrangement, each module has a fixed set of one or more timeslots allocated to it while the system is running. These timeslots are allocated when the system is configured (i.e., installed), typically by hardware jumpers on the modules or by parameters loaded into the modules by a software initialization program. The whole purpose of centralized (as opposed to distributed) switching is to minimize the size and cost of the circuitry on each line card module for allocating timeslots.

The present invention uses minimal circuitry for allocating timeslots in a module. An important innovation in the timeslot allocation circuit is once again the use of the two-phase timeslot clocks (TCLKA and TCLKB). Even though the timeslot buses 24, 25 (TSIN and TSOUT) each contain 512 timeslots, a particular module in a centralized switching application references its operation to either TCLKA or TCLKB, and therefore only has access to 256 timeslots (either the A group or the B group).

This A/B separation is important from a practical sense because 256 timeslots can be decoded with an 8-bit counter, while 512 timeslots require a 9-bit counter. Since present off-the-shelf counter circuits are 4-bit or 8-bit counters, the present invention realizes an important cost savings by using only two 4-bit (or one 8-bit) counter packages instead of three 4-bit (or two 8-bit) counter packages to perform timeslot decoding.

Another important contribution of the present invention is that a minimum number of switches or programmable bits are used to allocate a set of timeslots used by a particular module. For example, if a module needs 8 timeslots, then the 256 timeslots in group A or B are divided into 32 sets of 8, and a 5-bit number allocates one particular set. On the other hand, if a module needs 64 timeslots, then there are only 4 sets of 64, and a 2-bit number makes the allocation.

FIG. 5A shows a typical embodiment of the timeslot allocation or decoding circuit in each line card module. This particular embodiment decodes timeslots in either group A or group B, depending on the position of a switch 38. The 256 timeslots in the selected group are divided into 16 sets of 16 timeslots each; a particular set is allocated by a 4-bit number in switches 39. Timeslots 0 through 15 are in set 0; 16 through 31 are in set 1; 32 through 47 are in set 2; and so on.

A counter 31 is an 8-bit binary counter with outputs QA (least significant) through QH (most significant), which increments every time a rising edge occurs on the CLK lead input; except that if the LOAD input is 1 at the rising CLK edge, the counter will not count and will instead load the inputs present at A through H.

A decoder 33 is a circuit that activates at most one of its outputs (Y0 through Y15) at a time. If either the EN1 or the EN2 input signal is 0, all output signal of the decoder 33 are 0. However, if both EN1 and EN2 signals are 1, then the output signal corresponding to the binary number present at inputs A through D will be 1, and all other output signals will be 0.

A TSIN bus driver 35 is a three-state driver whose output signals are disabled if its ENABLE input signal is 0; if the ENABLE input signal is 1, then the input signals on the A0 through A7 leads are used to drive the TSIN bus 24.

An input register 36 contains 8 edge-triggered D flip-flops. If the CLKENABLE input signal is 1 when a rising edge occurs at the CLK input signal, then the D inputs (TSOUT bus values) are be stored in the flip-flops of the register 36 and appear at the Q output leads for transmission into the line card module; at all other times the Q output leads maintain their previous values.

The inverters 40 and AND gates 32, 34 are standard logic gates. FIG. 5B shows a timing diagram for the decoding circuit of FIG. 5A. Assuming that clock TCLKA has been selected by the switch 38, and the binary value in switches 39 is "0000", then the circuit decodes the timeslots in set 0, that is, timeslots 0 through 15. At the falling edge of the clock TCLKA during the TFRM pulse, a corresponding rising edge occurs at the CLK input lead of the counter 31, which loads the value $11110000_2$ into the counter outputs QH, QG, QF, QE, QD, QC, QB, QA. The four "1" bits produce a 1 at the output of the 4-input AND gate 31. The next time that the TCLKA clock is 1, both the EN1 and EN2 input signals of the decoder 33 are 1, and so the selected output signal (Y0) is 1, corresponding to timeslot A-0 on the TSIN and TSOUT buses. For the next 15 TCLKA cycles, QH through QE remain 1, while QD through QA count through the remaining 15 binary values, sequentially enabling the decoder output leads Y1 through Y15 at the timeslots A-1 through A-15.

Now supposing that instead of 0000, the binary value in switches 39 is 1110 (which is $14_{10}$). Then, the initial value in the counter 31 will be 00010000 instead of 11110000. Then starting with the TFRM pulse, it will take an extra 224 clock cycles for the counter to count to state "11110000," the first state in which a decoder output (Y0) is activated. Thus, timeslot set 14 (timeslots 224 through 239) is decoded. Operation is similar for other timeslot sets.

The AND gate 34 controls the ENABLE input lead of the three-state driver 35 so that it drives the TSIN bus 24 only during timeslots in the allocated set and only when TCLKA is 1, in accordance with the method of TSIN bus operation described earlier. The CLKENABLE input signal of the register 36 controls the register 36 so that its contents change only in response to timeslots in the allocated set.

The output lines of decoder 33 and the module timeslot buses for TSIN and TSOUT signals carry signals from or into the internal circuits of the module. The internal circuits of the modules are not part of this invention; moreover, this invention is useful to present line card modules and their internal circuits.

Clearly logical equivalences may be used in any digital logic circuit. The inverters 40 in FIG. 5 may be eliminated by redefining the polarity of the switches 39, and the discrete AND gate 32 eliminated by using the "ripple carry output" function already built into the binary counter circuit 31.

Also, the TCLK clock selection and timeslot-set number need not come from the switches 39. Other possibilities include, at one extreme, "hardwiring" these parameters according to the module's position on the bus, and at the other extreme, making them totally programmable by the output port bits of a microprocessor located on the module and stored in a latch. In the preferred embodiment, the TCLK selection switch 38 is a function of the module's position on the bus, while timeslot-set selection switch 39 is programmable through a microprocessor on the module.

The general scheme shown in FIG. 5 works very well for any number of timeslots that is a power of two, say $2^n$. In such cases, only 8n switches are used for the timeslot-set number (switches 39 in FIG. 5), and an 8-n input AND gate (gate 32) is used, while an n-to-$2^n$ decoder (decoder 33) is used. The starting timeslot of the set is always a multiple of the number of timeslots in the set. For example, if there are 8 32-timeslot sets, these start at timeslots 0, 32, 64, 96, 128, 160, 192, and 224, and run for 32 consecutive timeslots.

For non-powers-of-two, a design for the next highest power of two may be "pruned" to obtain the desired number of decoded timeslots. For example, for 14-timeslot allocation, the Y15 and Y14 outputs of the decoder 33 in FIG. 5A are not used inside the module, except that they should be inverted and connected to additional inputs of the AND gate 34 to inhibit the TSIN bus driver 35 when the Y14 or Y15 output signal is 1. The two left-over timeslots could be used by a module which only requires two timeslots.

In most arrangements, including the preferred embodiment of the invention, it is desirable to spread out the timeslots used by a line card module evenly across the entire 125 82 sec frame, rather than bunch them all together as shown in FIG. 5B. Spreading the timeslots out gives more time for local operations of the module to take place between timeslots, and may thereby reduce the cost and complexity of the module.

Spreading out the timeslots is accomplished quite easily by the circuit in FIG. 5A, by simply swapping the A through D inputs with the E through H inputs, respectively and the QA through QD outputs with the QE through QH outputs respectively, on the counter 31. When this is done, timeslot set 0 contains timeslots 0, 16, 32, . . . , 240, set 1 contains timeslots 1, 17, 33, 241, and so on.

In the timeslot allocation decoding of FIG. 5 and FIG. 5B, internal module timeslots in both the incoming direction and the outgoing direction occur at exactly the same time, even if timeslots are spread out as described above. However, signal producing and receiving circuits inside a module may require incoming and outgoing timeslots to occur at different times, perhaps with a 1-timeslot (488 ns) or ½-timeslot offset (244 ns).

A 1-timeslot offset can be obtained in almost any timeslot decoding circuit using flip-flop or register delays at appropriate points in the circuit. More difficult is a ½-timeslot offset. However, in contrast with the prior art, the present invention can easily obtain a ½-timeslot offset by once again exploiting the two-phase clocks (TCLKA and TCLKB). In particular, referring to FIG. 5A, if the TSIN driver 35 is enabled through AND gate 34 by the clock TCLKA, the counter 31 and the TSOUT register 36 could be clocked by the clock TCLKB, and vice versa. The EN2 input lead of the decoder 33 may be enabled by the TCLKA, TCLKB, or both clocks depending on the particular requirements for the decoder outputs inside the module.

Thus, each line card module has a particular number of switches 39 in FIG. 5A or preferably, programmable bits in its timeslot decoding circuit. This number corresponds to the size of the timeslot set, i.e., the number of timeslots, required to service the ports on that line card module. Additionally, besides minimizing the amount of circuitry for allocating sets of timeslots in a module, the present invention sets the value in the switches 39 or programmable bits so that different timeslot sets are allocated or assigned to different line card modules, even if different modules require different numbers of timeslots.

For example, suppose the following modules are present and (for simplicity) all must use timeslots in group B (say, group A is already filled up):

| Module Name | Timeslots Required | Allocation #1 | Allocation #2 |
| --- | --- | --- | --- |
| P | 16 | 0–15 | 192–207 |
| Q | 64 | 64–127 | 0–63 |
| R | 16 | 128–143 | 208–223 |
| S | 64 | 192–256 | 64–127 |
| T | 64 | ??? | 128–191 |

If timeslots are allocated sequentially and timeslot sets must begin at a timeslot that is a multiple of the size of the set, as presented previously, the modules P, Q, R, S, and T will be allocated as shown in Allocation #1. Module T has no longer 64 consecutive timeslots available. However, there is still a total of 96 available timeslots spread throughout the group of 256.

Therefore, the present invention makes the timeslot set allocations on each module programmable, directly or indirectly, by processors. In the present embodiment of the invention, the timeslot sets are directly programmable by microprocessors on each line card module, a central control module processor instructs the line card module microprocessors to make optimal timeslot-set allocations by sending them messages over a signaling bus described later with reference to FIG. 8.

The central module microprocessor allocates the timeslot sets by first assigning the sets which are the largest. Then the sets with the next largest number of timeslots are assigned. These steps continue until the smallest sets are assigned. In this manner, timeslot sets are the most effectively allocated. Allocation #2 is an example. This type of program for the central module microprocessor may easily be written by persons skilled in the art.

FIG. 3 shows that there are four module address connector lines, MOD3-0, for each module. These connectors may be coupled to ground by a ground line 41 or left open in a different pattern at each module position. Thus, in principle, there are sixteen different "hard-wired" 4-bit module addresses to identify each line card module. (Obviously, additional module address connectors may be used to provide a larger number of module addresses, e.g., five lines for 32 addresses.)

With each module having a different 4-bit address, a typical way in the prior art of addressing modules is the provision of a 4-bit Module Select bus on which the central control module places the address of a selected module. A 4-bit comparator on each module compares the signals on the Module Select bus with its own hard-wired address (MOD3-0) at all times to see if it is being selected. A disadvantage of this prior art is the size of the Module Select bus—four lines for a 4-bit address, and even more lines if more than 16 module addresses are required.

The Module Select bus in the present invention contains just one signal line 26. The MS signal on this line 26 can address up to 512 different modules for the purpose of allowing signaling between the central control module and the selected line card module. In the preferred embodiment that we now describe, this MS line 26 addresses 32 different modules.

The TCLKA, TCLKB, and TFRM clocks together define 512 unique timeslots. For the MS line 26, a smaller number of "select-slots" is defined. The select-slot number is just the remainder obtained from dividing the timeslot number by 16. Thus, timeslots A-1, A-17, and every sixteenth A-timeslot through A-241 are also select-slot A-1. In this arrangement, there are a total of 32 select-slots, numbered A-0 through A-15, and B-0 through B-15, which may correspond up to 32 line card modules. While timeslots repeat every 125 82 sec, the select-slots, since there are fewer of them, repeat approximately every 8 μsec.

In the present invention, a module is selected if the MS signal is "1" during the corresponding select-slot, or else the module is not selected. By placing an appropriate pattern on the MS line 26, the central control module may select none, one, some, or all of the line card modules. This is an improvement over the prior art, which had a parallel 4-bit bus, by which only one line card module was inflexibly selected.

FIG. 6A shows the selection logic on each module. A counter 42 is a 4-bit binary counter with outputs QA through QD, which increments every time a rising edge occurs on the CLK input. However, if the LOAD input signal is 1 at the rising CLK edge, the counter 42 will load the signals present at A through D input terminals. The D flip-flop 43 and inverters 44–46 are standard logic circuits.

FIG. 6B shows a timing diagram for the circuit to illustrate its operation of the circuit. Once per frame, the counter 42 is loaded with the complement of the module address number which is obtained from the MOD3-0 connectors. The counter 42 then increments on each rising clock TCLKA or TCLKB edge, as selected by a switch 47. On every 16the edge the counter 42 makes a transition from state 1111 to state 0000 (the counter "state" is the value at the QD, QC, QB, QA output terminals). This transition, in particular the 1-to-0 change on the QD output terminal, produces a 0-to-1 transition on the output terminal of inverter 45. This in turn clocks the current value of the MS line 26 into the D flip-flop 43. This flip-flop output signal, MODSEL, indicates whether or not this module is selected. The MODSEL signal remains stable until the next 1111-to-0000 transition, 16 clock cycles (approximately 8 μsec) later.

The select-slot in which the 1111-to-0000 transition occurs depends on the module address number. For example, if the module address number defined by MOD3-0 is 0010, and switch 47 selects TCLKA, then the select-slot of interest is A-2. Thus, the MS signal during the select-slot A-2 determines whether or not the module having module address 0010 is selected for the next 8 μsec.

Using both positions of the switch 47, it is possible to select 32 different modules. In the preferred embodiment of the invention, a physical switch 47 is not used. Rather, half the line card modules have their counter 42 clock inputs connected to TCLKA and the other half have their inputs connected to TCLKB. This gives rise to the 32 module addresses, A-0 through A-15, and B-0 through B-15.

It should also be noted that there are other simplifications which do not change the spirit of the invention. In particular, the inverters 44, 45 may be eliminated by simply inverting bits 0–2 of the hard-wired module address number. Thus, the preferred embodiment of the module-select circuit has minimal cost, consisting of an inexpensive 4-bit counter 42 and a D flip-flop 43.

There are many possible circuits for driving the MS line 26 by the central control module. FIG. 7 shows a circuit in the central control module which can be programmed to select none, one, or all of the line card modules. The counter 50 is similar to the counter 42 in FIG. 6A, except that it only counts if its EN input signal is 1. The FFRM signal is a frame signal similar to TFRM, except that the signal occurs 16 times as often; that is, it occurs not only during timeslot 255, but also during timeslots 15, 31, 47, and so on through 255. This clock signal can easily be generated by the clock circuit which generates TCLKA, TCLKB and TFRM.

The signals MODCEN, MODENA, MODENB, and MODN3-0 in FIG. 7 are connected to a microprocessor 61 (in FIG. 8) in the central control module which selects the line card modules. The microprocessor 61 may control these signals as follows:

To select no module, set MODENA and MODENB to 0.

To select all modules, set MODENA and MODENB to 1, set MODCEN to 0, and set MODN3-0 to 0000.

To select module A-i set MODENA and MODCEN to 1, set MODENB to 0, and set MODN3-0 to the binary representation of i.

To select module B-i, set MODENB and MODCEN to 1, set MODENA to 0, and set MODN3-0 to the binary representation of i.

By using the selection described above, a very efficient serial signaling bus can be created using only two more signal lines 27, 28, MI (Message In) and MO (Message Out) in FIG. 3. FIG. 8 shows the circuitry required on both the central control module and a line card module. The line card module circuitry is repeated on all other line card modules. UARTs 60, 70, are conventional Universal Asynchronous Receiver Transmitters, which send and receive serial messages on their TXD (Transmit Data) output leads and RXD (Receive Data) input leads. In many cases, the UART function is integrated with a single-chip microcomputer, such as the 8031 manufactured by Intel Corporation of Santa Clara, Calif. The other elements in FIG. 8 are standard logic gates and components.

The arrangement shown in FIG. 8 has several important advantages over conventional party-line signaling buses in the prior art. In a conventional party-line signaling bus, the TXD output leads from the central control's UART is bused directly to the RXD input leads of all the other module UARTs, and the TXD output leads of all the other module UARTs are "AND-tied" directly, without the benefit of MODSEL gating 62, 66, to drive the RXD input lead of the central control module's UART. Undesirable results of such an arrangement are:

Whenever the central control transmits, all modules must listen and determine whether or not the message current message is for them.

Some technique must be provided to prevent two or more modules from driving the MI line 27 simultaneously (otherwise their messages will be garbled). Conventional techniques include polling, token passing, and collision detection.

A single failed module can bring down the signaling bus for everyone, by generating "garbage" messages on the MI line.

In the present invention, the central control module can select which module it wishes to communicate with at any time. It does this using the module selection circuitry described previously. When a given module is selected its MODSEL signal is 1. Therefore, the selected module's TXD UART output signal is driven onto the MI line 27 through an open-collector NAND gate 62, and the signal on the MO line 28 is coupled into its RXD UART input lead through an OR gate 64. If the module is not selected, then the NAND gate 62 output lead is inactive (floating), and the RXD UART input lead signal is forced to 1, which is the "idle" condition for a conventional UART.

The central control module's ability to select a specific module to communicate with brings several advantages not enjoyed by a conventional party-line signaling bus arrangement:

When the central control module is communicating with a particular module, other modules are not disturbed—their UARTs see an "idle" RXD condition.

The mechanism for selecting which module drives the MI line 27 is straightforward. The central control selects a line card module, and this module is the only one that can drive the MI line 27.

The central control module is far more immune to hardware and software failures on individual line card modules. Even if a module "goes crazy," and continuously generates garbage messages on its UART's TXD output, the central control module simply refuses to select this module.

FIG. 8 illustrates how microprocessors 71 on the line card modules communicate with the microprocessor 61, such as a Motorola 68000 of Phoenix, Ariz., on the central control module. Each of the microprocessors 71 handles operations for its own line card module. The central microprocessor 61 handles operations for the entire PBX switch, including the allocation of time slots discussed previously and distributed timeslot switching discussed later. It should be understood that each of the microprocessors 61, 71 are also coupled to the other parts of their modules. The particular connections are dependent on the particular design of the modules.

Another advantage of the present invention is in the area of polling. In a signaling system with a single master (the central control module) and multiple slaves (the other modules), the master can contact the slaves at any time, but the slaves can contact the master only when the master allows it. Therefore, the master must have some means of finding out when a slave wishes to send something. Two conventional methods are:

Polling. The master periodically sends each slave a message, asking if it has anything to send.

Request-to-send (RTS) lines. Each slave has its own logic signal, called "RTSi", where i is the module number, which is bused back to the master. The slave asserts this signal when it has something to send, and the master periodically examines all of the RTS lines, and initiates a communication with the module which has asserted RTS.

The polling method requires no extra hardware, but it is slow and requires processing overhead to send and receive the (usually fruitless) polling messages. The RTS method is much faster and has less overhead (a slave is not disturbed unless it actually has something to send), but it requires more hardware and potentially a non-parallel bus to return the RTS lines to the central control module.

In the present invention, an RTS mechanism is achieved with no extra hardware. To request to send, a line card module simply places a continuous "0" logic value on its UART's TXD output, and waits for the central control module; this continuous 0 is known as a "break" condition in conventional UARTs.

In a conventional party-line system, one module sending a continuous break would drag down the MI line 27 for everyone. But in the present invention, the central control module sees the "break" only when it selects the requesting module. Therefore, the central control module can interpret a "break" as meaning "request to send."

Upon detecting the "break," the central control module microprocessor 61 sends a message to the requesting module, asking it to send whatever it has to send. At this point, the requesting module is activated, removes the break, and sends its information on the MI line 27;.

Alternatively, the central control module may ignore the "break," and force the selected module to receive a command. In any case, a module always removes the "break" while communicating with the central control module, and after the conversation it sends "break" only if it still has something more to send.

Another function of the signaling bus of the present invention is reset. In any digital system, it is necessary to reset the system to a known state at power-up. In addition, it is desirable to be able to reset the system at other times, if, for example, due to some transient error, the system goes into an unknown state during normal operation. For this reason, most systems provide reset pushbuttons, watchdog timers, and other devices.

In a modular system with microprocessors on each module, such as described herein, it is possible for an individual module to go into an unknown state, while the rest of the system functions normally. In PBX and other systems, it is very desirable to have a means of resetting just the errant module, without resetting other modules in the system, since resetting usually causes an undesirable loss of service.

In the present invention, the module selection mechanism provides a novel means of selectably resetting modules. As shown in FIG. 3 and FIG. 8, a single RESET signal is bused on a line 29 to all of the modules. The signal is driven by an output port bit of the microprocessor 61 in the central control module. On each line card module, this signal is combined by an AND gate 65 with the local MODSEL signal to provide a local MODRESET signal.

To reset a particular module, then, the central control module selects that module and then asserts RESET signal. The central control module must be careful to remove RESET signal before deselecting the module to prevent the undesired resetting of another module. For example, the control module might select some other module with which module to communicate on the signaling bus. Also, note that with the central control module MS driving circuit shown in FIG. 7, it is possible to select all of the modules, so that all the modules may be reset simultaneously for quick, complete, system initialization.

Finally, the present invention permits the time slot bus 24, 25 to operate in a distributed switching arrangement. Up to this point, the timeslot bus 24, 25 of FIG. 3 has been described in a centralized switching arrangement as shown in FIG. 2A. The signaling bus, specifically the MI line 27, MO line 28 and MS line 26, with their associated circuitry, provide for the present invention to operate in a distributed switching arrangement.

With the microprocessor 61, the central control module can easily be programmed not to drive the TSOUT bus 25 during certain timeslots. Through the MS line 26, the microprocessor 61 selects a particular line card module and informs the microprocessor 71 on that module card that a timeslot or timeslots on the TSOUT bus 25 have been assigned to that: line card module. Thus, the selected line card module can use the TSOUT bus 25, besides the TSIN bus 26, to send PCM voice and data signals. The microprocessor 61 can also allocate other timeslots on the TSOUT bus 25 to other line card modules.

Similarly, the microprocessor 61 may allocate timeslots on the TSIN bus 24 for selected line cards to receive voice PCM and data signals. Thus, the separation of the timeslot bus into a bus carrying outgoing signals (TSOUT bus 25) and a bus carrying incoming signals (TSIN bus 24) is removed. From an operation illustrated by FIG. 2A, the PBX switch with the present invention can also operate in a distributed switching arrangement as shown by FIG. 2B. Of course, the TSIN bus 24 driver circuit and the TSIN bus 25 driver circuit of FIG. 5A may easily be modified for bi-directional transmission and reception for distributed switching.

While the above provides a full and complete disclosure of the preferred embodiments of the invention, various modifications, alternate constructions, and equivalents may be employed without departing from the true spirit and scope of the invention. Therefore, the above description and illustrations should not be construed as limiting the scope of the invention which is defined by the appended claims.

We claim:

1. A digital PBX switch having a central control module and at least one line card module, said line card module having at least one port through which communication signals may pass to and from said switch, said central control module and said line card module coupled together by a bus having a first set of lines for defining timeslots, a second set of lines for carrying communication signals between said central control module and said line card module, and a third set of lines for carrying signaling information between said central control module and said line card modules, said line card module comprising
    means for generating signals to identify said module;
    means, coupled to said identification signals generating means and said first set of lines, for selecting a timeslot for said module;
    whereby a signal during said selected timeslot on a first determined one of said third set of lines coupled to said timeslot selection means addresses said module.

2. The digital PBX switch of claim 1 wherein a predetermined number of timeslots are defined for a predetermined interval of time, said selected timeslot determined by the remainder obtained from dividing said predetermined number of timeslots by a number corresponding to the number of line card modules in said PBX switch whereby said module may be addressed more than once during said predetermined time interval.

3. The digital PBX switch of claim 1 wherein each line card module further comprises means, coupled to said identification means and a second predetermined line, for resetting said module upon a signal on said second predetermined line when said module is addressed.

4. In a digital PBX switch having a plurality of modules, each module having at least one port for communicating signals to and from said PBX switch; a plurality of parallel lines for communicating said signals between said modules; clock means coupled to said modules for defining a number of timeslots for said signals on said communication lines; and a central control module coupled to said parallel communication lines, said control module transmitting signals to said modules on a first set of said parallel lines, said control module receiving signals from said modules on a second set of said parallel lines, said control module transmitting and receiving control signals to and from said modules on a third set of parallel lines;
    said control module comprising means for disabling itself from transmitting signals on said first set of lines in predetermined timeslots and for generating control signals indicative of said control module disablement on said third set of lines; and said modules comprising means, coupled to said third set of lines and responsive to said control signals, for transmitting and receiving signals on said first set of lines and for receiving and transmitting signals on said second set of lines during said predetermined timeslots.

5. The digital PBX switch of claim 4 further comprising:
    a universal bus comprising said first, second, and third sets of said plurality of communication lines, and a set of clock lines, wherein said universal bus allows and facilitates either central or distributed operation of said central control module and said other modules.

6. The digital PBX switch of claim 5, further comprising:
    discrete physical positions on said bus, said modules being coupled to said universal bus at said discrete physical positions;
    identification means associated with each said physical position on said bus providing to said module coupled to said bus at said position, a position address code representative of the physical position associated with said module; and
    allocation means within each said module responsive to said position address code for allocating a set of timeslots within a framing signal interval thereby selecting or addressing said module according to the physical position associated with said module.

7. The digital PBX switch of claim 6, wherein said position address code is supplied by either a set of switches, the number of switches indicative of the length of said position address code, or by a set of programmed bits, wherein said set of programmed bits representing said position address code allocates said timeslot set according to said physical position on said bus associates with said module.

8. The digital PBX switch of claim 7 wherein each said module further comprises programming means for altering said programmed bits to alter said timeslot set.

9. The digital PBX switch of claim 8 wherein each said module further comprises:
    reset means responsive to a reset signal on said third set of lines for resetting said module, said reset communication means being capable of resetting said programmed bits to a known state.

10. The digital PBX switch of claim 4 wherein said central control module allocates said predetermined timeslots to said modules for transmitting signals on said first set of parallel lines.

11. The digital PBX switch of claim 4 wherein said central control module allocates timeslots to said modules for receiving signals on said second set of parallel lines.

12. The digital PBX switch of claim 4 wherein said central control module allocates said predetermined timeslots to said modules for transmitting signals on said first set of parallel lines and for receiving signals on said second set of parallel lines.

13. The digital PBX switch of claim 12 wherein said third set of parallel lines comprises a first line for carrying a signal during a preselected timeslot for addressing a module corresponding to said preselected timeslot for allocating timeslots to said module.

14. The digital PBX switch of claim 13 wherein said third set of parallel lines comprises second and third lines for timeslot allocation signals to and from said module.

15. The digital PBX switch of claim 14 wherein said module comprises:
input/output means for receiving and transmitting said timeslot allocation signals from and to said second and third lines; and
means, responsive to said first line signal during said preselected timeslot and said input/output means for coupling said input/output means to said second and third lines.

16. The digital PBX switch of claim 15 wherein said input/output means comprises a universal asynchronous receiver transmitter coupled to said second and third lines.

17. A digital PBX switch having a plurality of modules, each module having at least one port for communicating signals to and from said PBX switch, a plurality of parallel lines for communicating said signals between said modules, and clock means coupled to said modules for defining a number of timeslots for the timing of said signals on said communication lines, each module comprising:
means for generating signals to identify said module,
means, coupled to said identification signals generating means and said clock means, for selecting a timeslot for said module;
whereby a signal during said selected timeslot on a first predetermined one of said lines coupled to said timeslot selection means addresses said module.

18. The digital PBX switch of claim 17 wherein each module further comprises means coupled to said identification signals generating means and said first predetermined line for generating a module selection signal when said module is addressed.

19. The digital PBX switch of claim 18 wherein each module further comprises:
input/output means for receiving and transmitting signaling data from and to a predetermined set of said lines; and
means, coupled to said module selection generating means and said input/output means for coupling said input/output means to said predetermined set of lines when said module selection signal is present.

20. The digital PBX switch of claim 19 wherein said input/output means comprises a universal asynchronous receiver transmitter and said set of predetermined lines comprises a pair of lines, one line for communicating received signaling data and the second line for communicating transmitted signaling data.

21. The digital PBX switch of claim 19 wherein when said input/output means has signaling data to transmit, said input/output means generates an output signal, said output signal is placed on said predetermined set of lines when said module selection signal is present, indicative of the state of said input/output means.

22. The digital PBX switch of claim 17 wherein each module further comprises means, coupled to said identification signals generating means and a second predetermined line, for resetting said module upon a signal on said second predetermined line when said module is addressed.

23. The digital PBX switch of claim 17 wherein a predetermined number of timeslots are defined for a predetermined interval of time, said selected timeslot determined by the remainder obtained from dividing said predetermined number of timeslots by a number corresponding to the number of modules in said PBX switch whereby said module may be addressed more than once during said predetermined time interval.

24. The digital PBX switch of claim 18 wherein
a predetermined number of timeslots are defined for a predetermined interval of time, said selected timeslot determined by the remainder obtained from dividing said predetermined number of timeslots by a number corresponding to the number of line card modules in said PBX switch whereby said module may be addressed more than once during said predetermined time interval, and
said generating means generating a module selection signal until said predetermined timeslot reoccurs.

25. A digital PBX switch having a central control module and at least one line card module, said line card module having at least one port through which communication signals may pass to and from said switch, said central control module and said line card module coupled together by a bus having a first set of lines for defining timeslots, a second set of lines for carrying communication signals between said central control module and said line card module, and a third set of lines for carrying signaling information between said central control module and said line card modules, said line card module comprising
means for generating signals to identify said module;
means, coupled to said identification means and said first set of lines, for selecting a timeslot for said module;
whereby a signal during said selected timeslot on said third set of lines coupled to said timeslot selection means addresses said module.

26. The digital PBX switch of claim 25 wherein during said selected timeslot said signal on a first determined one of said third set of lines addresses said module.

27. The digital PBX switch of claim 26 wherein each line card module further comprises means, coupled to said identification means and a second predetermined line, for resetting said module upon a signal on said second predetermined line when said module is addressed.

28. The digital PBX switch of claim 25 wherein a predetermined number of timeslots are defined for a predetermined interval of time, said selected timeslot determined by the remainder obtained from dividing said predetermined number of timeslots by a number corresponding to the number of line card modules in said PBX switch whereby said module may be addressed more than once during said predetermined time interval.

* * * * *